April 29, 1930.  C. F. SMITH  1,756,666
BRAKE TESTING APPARATUS
Filed March 10, 1927   3 Sheets-Sheet 1

Inventor
Charles F. Smith
By Macleod Calver Copeland &c
Attorneys

April 29, 1930.  C. F. SMITH  1,756,666
BRAKE TESTING APPARATUS
Filed March 10, 1927  3 Sheets-Sheet 2
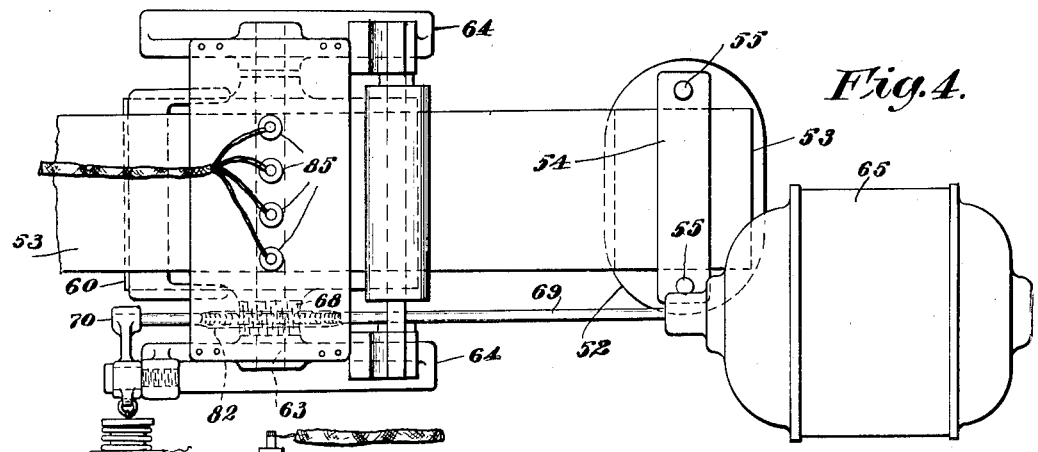
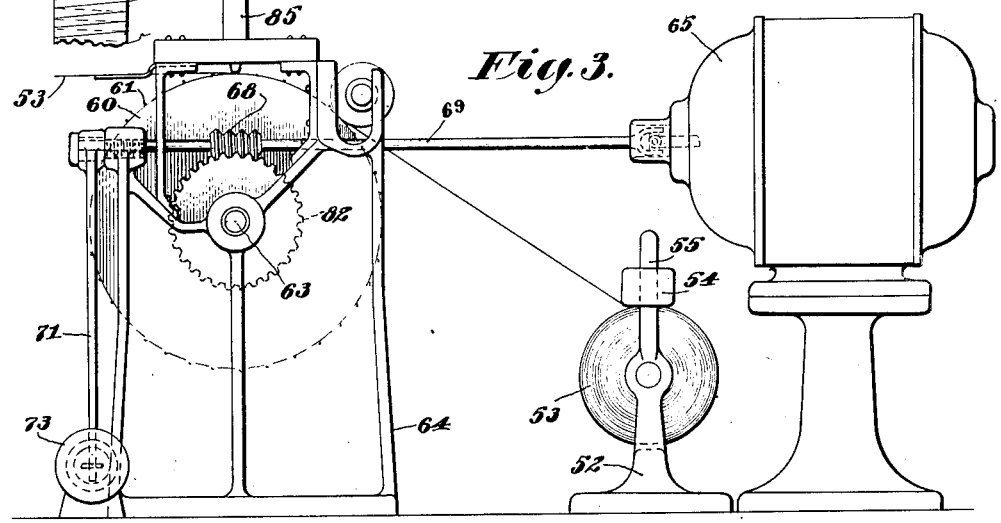
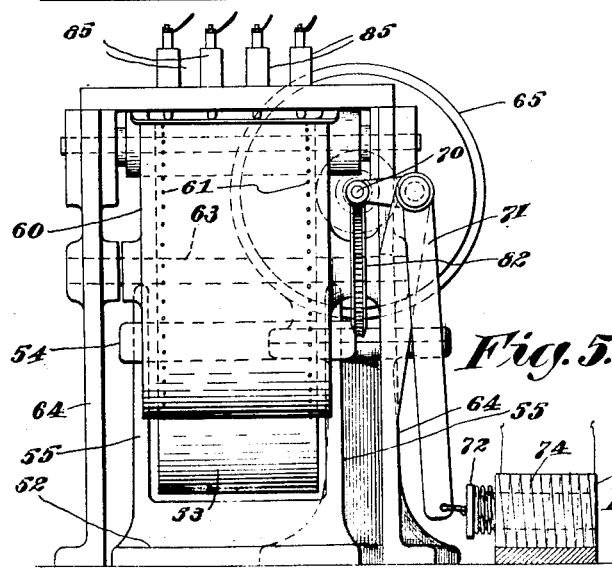
Inventor
Charles F. Smith
By Macleod, Calver, Copeland & Dike
Attorneys Patented Apr. 29, 1930

1,756,666

UNITED STATES PATENT OFFICE

CHARLES F. SMITH, OF QUINCY, MASSACHUSETTS, ASSIGNOR, BY DIRECT AND MESNE ASSIGNMENTS, TO BRAKE SYNCHROMETER CO., OF BOSTON, MASSACHUSETTS, A CORPORATION OF MASSACHUSETTS

BRAKE-TESTING APPARATUS

Application filed March 10, 1927. Serial No. 174,259.

This invention has for its purpose, the provision of an apparatus or a machine for testing the efficiency of brakes of automotive vehicles, and for enabling the brakes to be accurately and properly synchronized. An object of the invention is to provide a practical, convenient and efficient apparatus particularly adapted for carrying out the foregoing purpose wherein the apparatus is relatively simple and durable in construction and adapted for testing the brakes of various types of cars in a relatively short space of time.

In accordance with the invention the vehicle is supported in a stationary position while permitting the wheels to be rotated freely. A recording indicator is stationed near the vehicle and includes a tape movable over fixed distances in a given interval of time and upon which the deceleration of the vehicle wheels when the brakes are applied is separately indicated by impressions imparted thereon at intervals corresponding to predetermined distances of travel of each vehicle wheel. As a result, the time required to stop each wheel, and the distance it will travel before stopping, will be indicated upon the tape so that one may ascertain at a glance the condition of the brakes. The impressions may be imparted to the tape in any appropriate manner but in accordance with the preferred practice of the invention this is accomplished electrically through the instrumentalities of a device operatively connected with the vehicle wheel which opens and closes the electric circuit at frequent intervals corresponding to predetermined distances of travel of the vehicle wheel.

These and other objects of the invention will be more clearly understood from the following description in conjunction with the accompanying drawings; in which, Fig. 1 is a plan view illustrating an embodiment of the improved apparatus;

Fig. 3 is a side elevational view of the recording device and its associated parts;

Fig. 4 is a plan view of the same;

Fig. 5 is an end elevational view of the same;

Figures 1, 2:
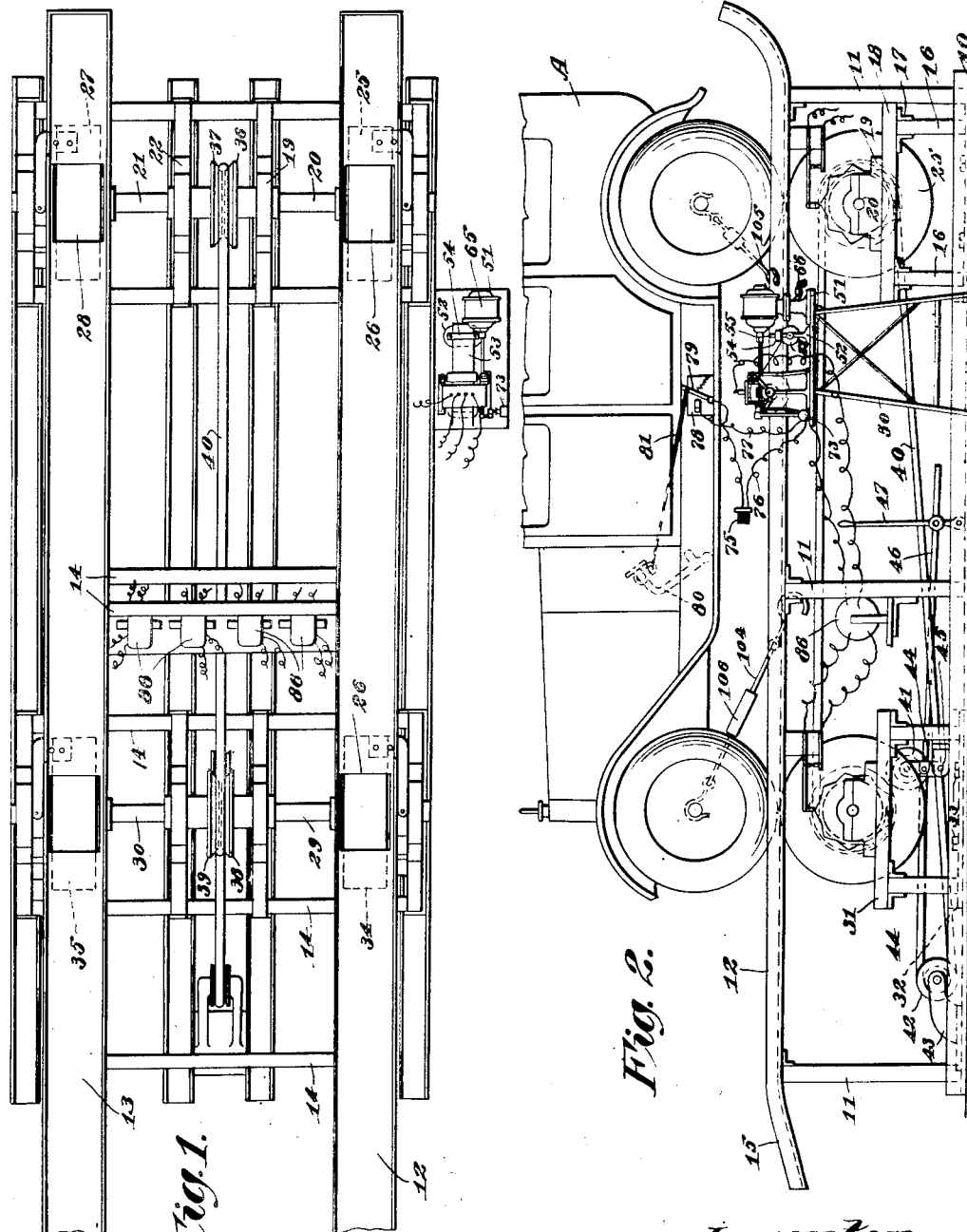
Fig. 2 is a side elevational view of the apparatus with an automobile in position for testing the brakes thereof.
Figure 6:
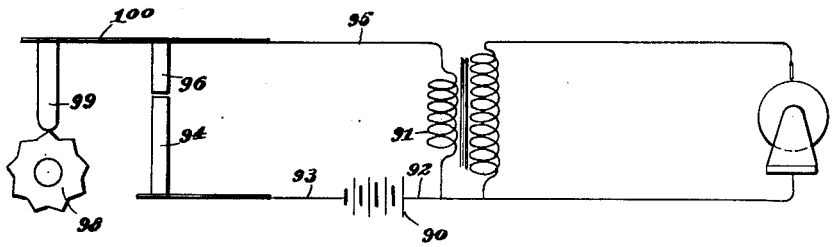
Fig. 6 is a diagrammatic view of the electrical device for imparting impressions upon the recorder tape; and, Fig. 7 is a plan view of a piece of the recorder tape showing the results of a brake test.

In the drawings I have illustrated a present preferred form of the invention as embodied in a device for testing vehicles having front wheel brakes. The apparatus as shown comprises suitable base plates 10 upon which are supported a plurality of columns 11 carrying a pair of spaced ways 12 and 13, this construction forming an elevated platform upon which an automobile or other vehicle A may be supported. The ways 12 and 13 are connected by cross members 14. The inclined runways 15 serve as an approach for positioning the vehicle upon the platform.

Supported beneath the ways 12 and 13 at the rear end thereof is a platform comprising uprights or columns 16 connected together by transverse beams 17, and mounted upon the latter are a plurality of longitudinal beams 18 supported in suitable bearings 19. On one pair of beams 18 is a transverse shaft 20 which terminates substantially midway between the opposite ways 12 and 13. In alignment with the shaft 20 and spaced endwise therefrom is a second shaft 21 which is supported by suitable bearings 22 carried by another pair of beams 18. The shafts 20 and 21, therefore, extend in alignment but are unconnected so as to be independently rotatable. Mounted upon the shaft 20 and fixed thereto is a fly-wheel 25 which projects a suitable distance through a slot or opening 26 in the supporting way 12. Mounted on the shaft 21 at the opposite side of the platform is a fly-wheel 27 which also projects through a slot 28 in the supporting way 13. From this construction it will be seen that when the vehicle is run onto the ways 12 and 13 the rear wheels may be entirely supported on the fly-wheels 25 and 27 and, therefore, the latter will be rotated from the vehicle wheels.

At the front end of the device are located two shafts 29 and 30 supported on a frame 31 (see Fig. 2) which is similar to the frame already described which supports the two rear fly-wheels 25 and 27. The frame 31, however, is adjustable lengthwise of the vehicle to adapt the device to vehicles of different wheel base. Any convenient adjustment can be employed. In the drawings, I have shown the uprights of the frame 31 mounted in slotted members 32 by bolts 33, by means of which the slotted members 32 may be clamped in the desired position of adjustment. The shafts 29 and 30 carry fly-wheels or rotors 34 and 35 correspondingly arranged to the fly-wheels at the rear of the device.

If the device is to be used to test the braking power of a vehicle equipped with front wheel brakes it is preferable that the two front fly-wheels 34 and 35 be given a momentum equal to the momentum of the fly-wheels which are actuated by the rear wheels of the vehicle. Since the front wheels of the vehicle are not themselves power driven, power is applied thereto from the rear shafts 20 and 21 in the following manner: On the proximate ends of the shafts 20 and 21 are placed halves 36 and 37 respectively of a grooved pulley. The halves of the grooved pulley are placed apart enough so that there will be no frictional contact between their adjacent faces and the ends of the shafts. A similar grooved pulley made in two pieces 38 and 39 is secured respectively to the proximate ends of the front shafts 29 and 30. Around these pulleys runs an endless belt 40, conveniently a rope, which also passes around two idle pulleys 41 and 42, the latter of which is secured to a bracket 43 secured in the floor or on a fixed part of the machine. The idle pulley 41 is mounted on the upper end of a lever 44 pivoted at 45 to the adjustable carriage or frame 31. The lever 44 is connected by a rod 46 to a hand lever 47 by means of which the pulley 41 may be moved to tighten or loosen the belt 40. From the foregoing it will be seen that the friction of the belt on the several pulleys tends to equalize the speeds of each of the pulleys and maintain them uniform and equal.

A suitable recording device is set up near the platform upon which the automobile A is supported and comprises a suitable frame 50 supporting a platform 51. The platform 51 supports a bracket 52 upon which a roll of recording tape 53 is rotatably carried and is held against free rotation by a brake device, such as a weight 54 slidably mounted upon arms 55 of the bracket 52. The recording tape 53 is drawn from the roll and moved over fixed distances in given intervals of time in any appropriate manner. A suitable arrangement for this purpose may comprise a roll 60, preferably of a good electrical conductive material, having a plurality of spaced teeth 61 projecting therefrom and adapted to engage corresponding openings 62 in the recording tape. The roll 60 is fixed upon a shaft 63 which is rotatably mounted in suitable bearings in a frame 64 supported upon the platform 51. The roll 60 may be rotated to move the tape uniformly at a desired rate of speed by means of a motor 65 suitably mounted upon a shaft 69 which is universally connected at one end to the motor 65 and is supported at its other end in a suitable bearing 70 in one arm of a bell crank 71 pivotally mounted upon the frame 64. The other arm of the bell crank 71 is connected to and actuated by an electromagnetic device. In the device as illustrated in the drawings the bell crank 71 is connected to the core 72 of a solenoid 73 comprising windings 74 connected to a suitable source of electrical supply, such as a socket 75 in an electrical supply line, by means of conductors 76 and 77. Interposed in the conductor 77 is an electric switch 78 having a movable arm 79 connected to the brake lever 80 by a wire or rod 81. By such construction the worm 68 may be moved into and out of operative relation with a worm wheel 82 mounted upon the shaft 63.

A suitable device is provided for imparting impressions upon the recorder tape 53 from the time the brakes are applied to the vehicle wheels until the latter are brought to a stop. The device specifically illustrated in the drawings for this purpose comprises a plurality of spark plugs 85 mounted upon and insulated from the frame 64 so that their extremities are in contact with the recording tape over the roll 60. Each of the spark plugs 85 are connected in the secondary circuit of a separate transformer 86, the circuit being completed through the roll 60 and grounded in the frame 64. The transformers 86 are supplied with power from any suitable source, such as a battery 90 one terminal of which is connected to the primary coil 91 of each transformer by conductors 92. The other terminal is connected by conductors 93) to contacts 94 of electric switches, there being a separate switch serving each wheel. The primary coil 91 of each transformer is also electrically connected by separate conductors 95 to the movable contacts 96 cooperating in separate switches for each wheel with the contacts 94 to open and close the electrical circuits through the transformers 86 and thereby supply power of sufficient potential to cause a spark to pass between each of the plugs 85 and the roll 60.

In accordance with the invention each contact 96 is moved into and out of engagement with the contact 94 with which it cooperates at frequent intervals corresponding to predetermined distances of travel of the vehicle wheel with which it is operatively associated. For this purpose a cam 98 is mounted for rotation in synchronism with each of the vehicle wheels. As illustrated a cam 98 is mounted upon each of the shafts 20, 21, 29 and 30, each being operatively associated with a separate cam follower 99. A separate resilient arm 100 is associated with each wheel carrying a contact 96 and a cam follower 99. The face of each cam 98 is so shaped as to cause the cam follower 99 to move towards and away from its axis to bring the contacts 96 into engagement with the contacts 94 at frequent intervals corresponding to predetermined distances of travel of each vehicle wheel.

Preferably the recorder tape 53 is provided with graduations indicating its distance of travel in given intervals of time. As illustrated, the tape 53 is provided with a plurality of solid lines 101 spaced apart an amount corresponding to the distance of travel of the tape in a second. Each of these divisions is appropriately sub-divided, and as shown is sub-divided into eight parts each corresponding to the amount of travel of the tape in one-eighth of a second but if desired the division may be sub-divided in a greater number of parts, for example, to correspond to the amount of travel of the tape in one thirty-second of a second.

In using the device of the invention for testing the brakes of a vehicle or automobile having front wheel brakes the car is driven on to the ways 11 and 12, so that its rear wheels will be supported entirely upon the flywheels 25 and 27. The front wheels rest upon the flywheels 34 and 35, the frame 31 being adjusted longitudinally to suit the wheel base of the car and the belt 40 is tightened by the lever 47. The vehicle is held in fixed position in any appropriate manner as by anchor cables 104 and 105 which connect the axles of the wheels to the stationary platform, these cables being adjustable by means of turning buckles 106. The engine of the car is then started, thereby driving its rear wheels which frictionally drive the fly-wheels 25 and 27 at the same speed. The front fly-wheels 34 and 35 are driven by the belt 40. When all the fly-wheels rotate at the same predetermined speed the lever 47 is pushed forward loosening the belt 40 and allowing all the wheels to run independently of each other since the rope is ineffective unless drawn tight into the pulleys. Then the clutch of the car is thrown out disconnecting the engine, and the brake pedal 80 is depressed to apply the brakes.

As the brake pedal 80 is depressed the rod 81 is moved to close the switch 78, and consequently the electrical circuit through the solenoid 73, thereby actuating the bell crank 71 to bring the worm 68 into operative engagement with the worm gear 82 to rotate the drum 60 and move the recorder tape 53 at the desired uniform rate beneath the spark plugs 85. The rotation of the vehicle wheels in contact with the fly-wheels causes movement in synchronism therewith of each of the cams 98 whereby the electrical circuits through the transformers 86 are frequently opened and closed to cause a spark to pass through the recorder tape, and thereby make an impression thereon at intervals corresponding to predetermined relatively small distances of travel of each vehicle wheel.

Figure 7:
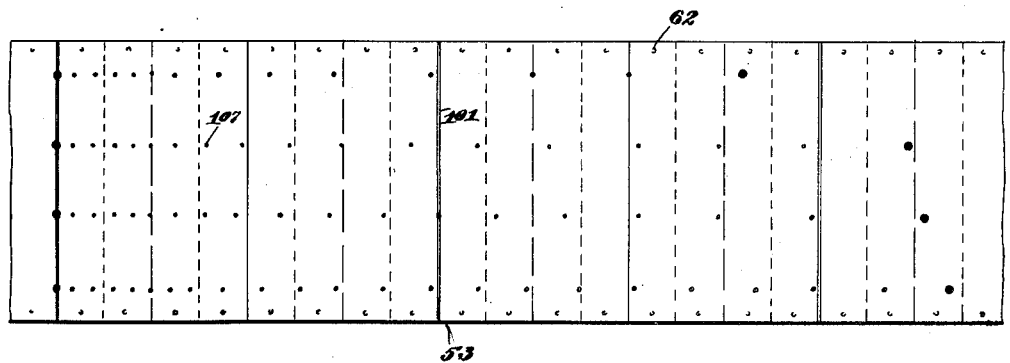

These impressions are indicated in Fig. 7 by the dots 107 which, it will be noted, are progressively farther apart from the left to the right as the speed of each vehicle wheel becomes decreased. The distance of travel of the vehicle wheels corresponding to the interval between the dots 107 may conveniently be one foot. Thus, by examining the tape 53 after the test the location of the dots or impressions 107 will show at a glance the time that is required to stop each wheel, as well as the distance that each wheel travels before being stopped after application of the brakes. The time required to stop the vehicle and the distance which it will travel after application of the brakes may be readily computed by averaging the times and distances of travel of each of the vehicle wheels after application of the brakes. In this manner the provisions of the present invention provide an apparatus whereby the condition of the vehicle brakes may be readily and accurately ascertained so that they may be properly adjusted.

What I claim is:

In an apparatus for testing the brakes of a vehicle, the combination of a tape, a rotatable drum engaging and arranged to move the tape uniformly over predetermined distances in a given interval of time, mechanism for moving said drum, an electric circuit operating means for making an impression on said tape, means for opening and closing said electrical circuit at intervals corresponding to fixed distances of travel of the vehicle wheel, a source of electrical energy, driving connections between said mechanism and drum including an electrically operated clutch, and means actuated by the operating mechanism for the vehicle wheel brake for connecting said source simultaneously with said circuit and said electrically operated clutch.

In testimony whereof I affix my signature.

CHARLES F. SMITH.